United States Patent [19]

Sommese et al.

[11] Patent Number: 5,702,613
[45] Date of Patent: Dec. 30, 1997

[54] POLYMERS CONTAINING VINYLAMINE/VINYLFORMAMIDE AS DEMULSIFIERS IN OILY WASTEWATERS

[75] Inventors: Anthony G. Sommese; Ananthasubramanian Sivakumar, both of Naperville, Ill.

[73] Assignee: Nalco Chemical Company, Naperville, Ill.

[21] Appl. No.: 235,748

[22] Filed: Apr. 29, 1994

[51] Int. Cl.$^6$ .................................................... C02F 1/56
[52] U.S. Cl. .................... 210/708; 210/735; 252/344; 252/358
[58] Field of Search .................... 210/708, 710, 210/712, 713, 725, 727, 728, 735; 252/341, 344, 358

[56] References Cited

U.S. PATENT DOCUMENTS

| | | | |
|---|---|---|---|
| 3,509,046 | 4/1970 | Annano et al. | 210/708 |
| 3,715,336 | 2/1973 | Nowak et al. | 210/735 |
| 4,217,214 | 8/1980 | Dubin | 210/735 |
| 4,588,508 | 5/1986 | Allenson et al. | 210/708 |
| 5,185,083 | 2/1993 | Smigo et al. | 210/735 |
| 5,281,340 | 1/1994 | Sato et al. | 210/735 |
| 5,292,441 | 3/1994 | Chen et al. | 210/735 |
| 5,324,792 | 6/1994 | Ford | 525/378 |
| 5,435,921 | 7/1995 | Collins et al. | 210/735 |
| 5,441,649 | 8/1995 | Sommese et al. | 210/735 |
| 5,573,675 | 11/1996 | Sommese et al. | 210/735 |

FOREIGN PATENT DOCUMENTS 619747   5/1961   Canada ................................. 210/735

Primary Examiner—Peter A. Hruskoci
Attorney, Agent, or Firm—Robert A. Miller; Kelly L. Cummings

[57] ABSTRACT

The invention provides a method of removing emulsified oil from an industrial wastewater stream. According to the method, a vinylamine polymer is added to the oil containing wastewater in a concentration of from about 0.1 to about 100 parts per million based on the total volume of the water being treated. The vinylamine polymer includes from about 1 to about 100 mole percent vinylamine and from about 1 to about 99 mole percent of at least 1 monomer selected from the group consisting of amidine, vinylformamide, vinyl alcohol, vinyl acetate, vinyl pyrrolidinone and the esters, amides, nitriles and salts of acrylic acid and methacrylic acid. The addition of the polymer to the oil containing wastewater causes the emulsified oil to flocculate. The flocculated oil is then removed from the wastewater.

8 Claims, No Drawings

POLYMERS CONTAINING VINYLAMINE/ VINYLFORMAMIDE AS DEMULSIFIERS IN OILY WASTEWATERS

BACKGROUND OF THE INVENTION

1. Field of the Invention

The invention is directed to compositions and methods for removing oil from industrial wastewaters; and more particularly, the invention is directed to a method of removing oil from oily waters produced in industry using vinylamine containing polymers.

2. Description of the Prior Art

In industry, oily wastewaters are produced in various processes located in the steel and aluminum industries, chemical processing industry (CPI), automotive industry, laundry industry and refinery industry. In these industries, highly refined oils, lubricants and greases contact water. This results in a highly dispersed or severe oil-in-water emulsion in the wastewater streams.

Wastewater from steel and aluminum mills using hot rolling mills contain lubricating and hydraulic pressure hydrocarbons. Wastewater from cold rolling mills contain oil that lubricates the sheets and reduce rust. For example, in cold rolling mills, oil-in-water emulsions are sprayed on the metal during rolling to act as coolants.

Metalworking plants generate wastewater streams containing lubricating and cutting oils, lapping and deburring compounds, grinding and other specialty fluids. These oils are generally highly refined hydrocarbons. The wastewater streams in animal rendering plants, creameries, bakeries, breweries and canneries contain natural fats and oils from animal processing and oils from packing and container manufacture. Wastewaters from cotton and wool manufacturing plants contain oils and greases from the scouring, desizing and finishing operations. Finishing oils are used in cotton and wool manufacturing to reduce friction and snagging of fibers on spinning machines which use machine lubricating oils, these oils end up in the wastewater. Processes in other industries also generate oily wastewater such as: paints, surface coatings, and adhesives; oils, fats, and waxes; soaps and detergents; dyes and inks; and the leather industry.

The emulsified oil in the wastewater is typically present in the range of several hundred to tens of thousands of ppm. It is critical to remove this oil from an environmental standpoint. The United States Environmental Protection Agency has placed tight restrictions on total oil and grease (TOG) limits for water that is to be discharged into public drinking water supplies or into open bodies of water. The removal of this oil is very critical to the established discharge limits for total dissolved solids (TSS), carbon oxygen demand (COD), biological oxygen demand (BOD) and total organic carbon (TOC) into local sewers and rivers. Not only has the EPA established severe limits on the oil and grease discharge, these industries are affected by local city ordinances as well.

One of the most effective methods of removing the emulsified oil in wastewater is through the use of the chemical aids. Typically these dispersions or emulsions require 10 to 100 times the dosage needed for other emulsion breaking applications, such as removing crude oil from water.

Historically, dry polymers, solution polymers, inverse emulsion latexes and metal ions have been used to treat the produced water. Each material has its own advantages and disadvantages. While dry polymers have the benefit of being extremely concentrated, thereby reducing shipping costs, the equipment to dissolve the polymers is expensive and is not available to all end-users on site.

Latex polymers also suffer from problems but are used quite frequently. Latex polymer preparations include 30–35% solids dispersed in oil. The latex polymer must be also inverted prior to use. Numerous problems associated with this feeding method have caused many customers to avoid latex polymers. In addition, the latexes generally have a very narrow treating range, often resulting in overtreatment at higher dosages. Furthermore, latex polymers add even more oil to the stream to be treated. Of course, adding more oil is something most customers would not want to do when treating their wastewater streams.

Although solution polymers require no prior make up, the percent solids and molecular weight are severely limited due to the nature of the material. These materials are often used to break oil-in-water emulsions, but they are unable to flocculate the dispersed oil, thus requiring another chemical to accomplish this.

Metal ions, such as, $Fe^{3+}$, $Zn^{2+}$, $Al^{3+}$, etc., have long been used to break oil-in-water emulsions, but recent government regulations have restricted their levels in discharged streams. Although effective at breaking oil-in-water emulsions, they, too, require another chemical to flocculate the oil.

The vinylamine polymers of the invention offer many solutions to these problems and represent a new method to industrial wastewaters.

SUMMARY OF THE INVENTION

A method of removing emulsified oil from industrial waste water stream, the method comprising the step of adding to oil containing water from about 0.1 to about 100 parts per million of the polymer based on the total volume of the water being treated, the polymer including from about 1 to about 100 mole percent vinylamine and from about 1 to about 99 mole percent of at least 1 monomer selected from the group consisting of amidine, vinylformamide, vinyl acetate, vinyl alcohol, vinyl acetate, and vinyl pyrrolidinone, wherein the addition of the polymer to the oil containing water causes the emulsified oil to flocculate; and removing the flocculated oil from the oil containing water.

DESCRIPTION OF THE PREFERRED EMBODIMENTS

The invention provides a superior method for removing emulsified oil from industrial wastewater. Vinylamine containing polymers have been discovered to be more effective in removing emulsified oil from industrial wastewaters than currently available chemical treatments. As will be discussed in more detail below, polymers of the invention offer numerous advantages which have previously been unavailable to operators of industrial processes. The polymers are water-soluble and, unlike latex polymers, there is no oil solvent. This is important since: the polymers do not present a fire hazard; oil is not added to the water which is to be treated (more environmentally friendly); dissolution of the polymer requires only the addition of water—no special activators are needed; the ability for these materials to dissolve/invert is superior to that of oil dispersion latexes; and the polymers may be diluted to virtually any concentration by using water. This physical property enables any standard chemical pump to deliver the material at the injection site.

The invention provides a vinylamine polymer demulsifying composition and a method of using the same. The invention provides improved oil removal from industrial water containing emulsified oil. The invention uses a vinylamine copolymer or homopolymer to accomplish this goal. According to the invention, the polymer is a homopolymer, copolymer or terpolymer which contains from about 1 to about 100 mole percent vinylamine monomer and/or a monomer hydrolyzable to vinylamine, and/or from 1–99 mole percent of amidine, vinylformamide, vinyl alcohol, vinyl acetate, vinyl pyrrolidinone or the esters, amides, nitriles and salts of acrylic acid and methacrylic acid.

For purposes of this invention, vinylamine monomers includes vinylamine and those monomers which are hydrolyzable to the following formula:

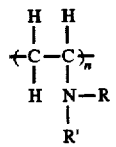

wherein: R and R' are, preferably, one substituent group selected from the group consisting of hydrogen and an alkyl group having from 1–10 carbon atoms. More preferably, R is hydrogen or is an alkyl group having 1–4 carbons.

The vinylformamide monomer of the invention is non-hydrolyzed and has the following structure:

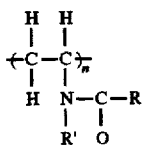

wherein: R and R' are, preferably, one substituent group selected from the group consisting of hydrogen and an alkyl group having from 1–10 carbon atoms. More preferably, R is hydrogen or is an alkyl group having 1–4 carbons.

For purposes of the invention, acrylic acid monomer includes acrylic acid and those monomers hydrolyzable to the following formula:

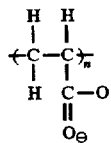

The amidine moiety, derived from the amine hydrolysis of polyvinyl formamide has the following structure:

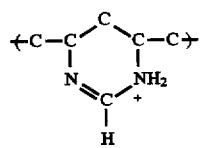

One preferred method of producing the vinylamine/vinyl alcohol containing polymers of the invention is to polymerize vinylformamide and vinyl acetate. Thereafter, the copolymer is hydrolyzed to a vinylamine/vinyl alcohol copolymer.

According to one embodiment of the invention, the demulsifying composition of the invention includes a vinylamine/vinyl alcohol copolymer. Preferably, the copolymer will include from about 1 to about 99 mole % vinylamine and about 1 to about 99 mole % vinyl alcohol. More preferably, the copolymer will include from about 2 to about 50 mole % vinyl alcohol and from about 98 to about 50 mole % vinylamine. Most preferably, the vinyl alcohol is included in the copolymer in an amount of from about 10 to about 20 mole % and the vinylamine is included in an amount of from about 90 to about 80 mole %.

According to a further embodiment of the invention, the demulsifying composition includes a vinylamine/vinylformamide copolymer. Preferably, the copolymer includes from about 1 to about 97 mole % vinylamine and from about 1 to about 97 mole % vinylformamide. More preferably, the copolymer includes from about 10 to about 50 mole % vinylamine and from about 10 to about 50 mole % vinylformamide. Most preferably, the copolymer includes from about 10 to about 20 mole % vinylamine and from about 10 to about 20 mole % vinylformamide.

According to a further embodiment of the invention the demulsifying composition includes a vinylamine/vinylformamide/amidine terpolymer (A/B/C) in monomer ranges of: A 15–90%; B 5–60%; and C 5–60%. Most preferably the monomer range is about 65/5/30, respectfully.

The demulsifying compositions of the present invention are applied to the oily wastewaters as a dilute aqueous solution. Preferably, the aqueous solution is applied to the oily wastewaters in a dosage of from about 0.100 to about 100.0 parts per million (ppm) of the polymers of the invention based on the total volume of the water. More preferably, the polymers of the invention are added to the oily wastewater in a dosage of from about 1.0 to about 50 parts per million. Most preferably, the polymers of the invention are added to the wastewater in a dosage of from about 2.0 to about 20.0 parts per million. It should be noted, however, that there does not appear to be a maximum dosage at which the polymers adversely affect the system. It does appear that at some higher doses the beneficial affect plateaus, and on a cost basis such higher doses, probably above about 100 ppm, are not cost effective.

Processes for making the polymers of the invention are well known in the art. U.S. Pat. Nos. 5,126,395, 5,037,927, 4,952,656, 4,921,621, 4,880,497 and 4,441,602 all describe methods for preparing the polymers of the invention. Solution polymerization produces the desired molecular weight dosage. The resulting vinylformamide homopolymers are susceptible to alkaline or acid hydrolysis which converts some or all of the amide groups to amine groups. These U.S. patents all describe methods for preparing the polymers of the invention. Hydrolysis of the amide groups to yield the amine can be achieved by using acid or base. By controlling the stoichiometry of the hydrolyzing agent it is possible to produce vinylamine/vinylformamide copolymers of varying composition. If vinylformamide is polymerized with other ethylenically unsaturated monomers, then hydrolyzed, it is conceivable that the polymer produced will contain at least three and possibly more functional groups. Cyclic amidine is produced by the amine hydrolysis of polyvinylformamide.

Once the polymers of the invention are added to the wastewater stream, the treated water is naturally agitated as it moves through the process system of an industrial plant. The polymers of the invention will cause the emulsified oil to separate from the water and float to the surface of the water as a floc. The floc is subsequently removed from the surface of the water and handled further. The treated water can now be discharged either into a river, lake or recycled into an industrial process.

The following examples are presented to describe preferred embodiments and utilities of the invention and are not meant to limit the invention unless otherwise stated in the claims appended hereto.

EXAMPLE 1

The treating abilities of the polymers of the invention and commericial polymer preparations where evaluated by visually comparing water clarity through several sets of agitation. Two (2) to about five (5) gallons of wastewater were collected at an oil refinery. 100 ml samples of the wastewater was mixed with the treating chemicals at 330 rpm for 2 minutes and then at 25 rpm using a gang stirrer. The treating chemicals of the invention were compared to NALCO® 7134 and NALCO® 8105 obtained from Nalco Chemical Company, Naperville, Ill. NALCO 7134 and NALCO 8105 are solution polymers which are commonly used in this refinery wastewater application. After 2 minutes of standing, an aliquot from the treated water was placed in a glass cell and the turbidity was measured on a HACH® ratio/xR turbidimeter. The data obtained is summarized in Tables I–VIII.

At another refinery, 100 ml samples of oily wastewater were placed in bottles, and heated from 15 minutes at 160° F. The treating chemicals were added, the bottles were capped, numbered and agitated. All samples were agitated identically. The agitation was intended to match water clarification system conditions. A HACH® turbidimeter was used to determine clarity. The data is summarized in Table IX.

TABLE III

Emulsion Breaking; Refinery 1
(Blank Turbidity = 293 NTU; Polymer Conc. as Actives)
Nalco ® 8105

| Dose ppm | Turbidity NTU |
|---|---|
| 1.9 | 120 |
| 3.7 | 713 |
| 5.6 | 55.4 |
| 7.4 | 43.8 |
| 9.3 | 41.1 |
| 11.1 | 40.6 |
| 13 | 41.7 |
| 14.8 | 39.8 |
| 16.7 | 83.2 |
| 18.5 | 110 |
| 20.4 | 139 |
| 22.2 | 156 |

TABLE I

Emulsion Breaking: Refinery 1
(Blank Turbidity = 469 NTU; Polymer Conc. as Actives)

| Dose (ppm) | PVAm (MW 300–500K) | Turbidity 70/30 VAm/VF (MW 300–500K) | (NTU) 75/25 VAm/vinyl pyrrolidone (MW 1–2 million) | 70/30 VAm/DADMAC (MW 500–700K) |
|---|---|---|---|---|
| 0.5 | 164 | 90 | 198 | 98 |
| 0.75 | 69 | 44 | 67 | 37 |
| 1 | 39 | 29 | 46 | 31 |
| 1.25 | 34 | 28 | 32 | 24 |
| 1.5 | 27 | 25 | 22 | 16 |
| 1.75 | 20 | 15 | 32 | 16 |
| 2 | 23 | 12 | 18 | 15 |
| 2.25 | — | 11 | 17 | 14 |
| 2.5 | 21 | — | 12 | 13 |

TABLE II

| Dose (ppm) | PVAm (MW 300–500K) | Turbidity 95/5 VAm/NaAc (MW 900K–1.4 MM) | (NTU) 90/10 VAm/NaAc (MW 900K–1.4 MM) | 80/20 VAm/NaAc (MW 400–600K) | 50/50 VAm/NaAc (MW 500K–1.2 MM) |
|---|---|---|---|---|---|
| 0.25 |  | 297 | — | 169 | 110 |
| 0.5 | 164 | 202 | 367 | 57 | 46 |
| 0.75 | 69 | 152 | 152 | 26 | 29 |
| 1 | 39 | 92 | 92 | 17 | 22 |
| 1.25 | 34 | 83 | 49 | 6 | 12 |
| 1.5 | 27 | 51 | 46 | 11 | 17 |
| 1.75 | 20 | 36 | 42 | — | 12 |
| 2 | 23 | 28 | 31 | 7 | 16 |
| 2.25 | — | 32 | 35 | — |  |
| 2.5 | 21 | 25 | 24 |  | 16 |

TABLE IV

Emulsion Breaking; Refinery 1
(Blank Turbidity = 293 NTU; Polymer Conc. as Actives)
Nalco ® 7134

| Dose ppm | Turbidity NTU |
| --- | --- |
| 5 | 99.3 |
| 10 | 77.3 |
| 15 | 97.3 |
| 20 | 125 |
| 25 | 89.2 |
| 30 | 117 |
| 35 | 193 |
| 40 | 210 |
| 45 | 194 |

TABLE V

Emulsion Breaking; Refinery 1
(Blank Turbidity = 272 NTU; Polymer Conc. as Actives)
Polyvinylamine (PVAm MW 25–35K)

| Dose ppm | Turbidity NTU |
| --- | --- |
| 6.5 | 36 |
| 13 | 29 |
| 26 | 15.1 |
| 39 | 13.3 |
| 52 | 15.3 |
| 65 | 12.6 |
| 78 | 23.6 |
| 91 | 12.8 |
| 104 | 13.3 |

TABLE VI

Emulsion Breaking; Refinery 1
(Blank Turbidity = 272 NTU; Polymer Conc. as Actives)
PVAm + 10% octyl chloride MW 30–50K

| Dose ppm | Turbidity NTU |
| --- | --- |
| 6 | 127 |
| 12 | 41 |
| 24 | 15 |
| 36 | 16 |
| 48 | 14 |
| 60 | 16 |
| 72 | 23 |
| 84 | 34 |
| 96 | 13 |

TABLE VII

Emulsion Breaking; Refinery 1
(Blank Turbidity = 293 NTU; Polymer Conc. as Actives)
Polyvinylamine (PVAm) MW 1–1.2 million

| Dose ppm | Turbidity NTU |
| --- | --- |
| 5 | 32 |
| 10 | 46 |
| 15 | 19 |
| 20 | 26 |
| 30 | 47 |
| 40 | 60 |
| 60 | 252 |
| 80 | 300 |

TABLE VIII

Emulsion Breaking Refinery 1
(Blank Turbidity = 400 NTU; Polymer Conc. as Actives))

| Dose (ppm) | PVAm (MW 120–130K) | Turbidity PVAm (MW 300–500K) | NTU PVAm (MW 1–1.2 million) | 70/30 VAm/VF (MW 300–500K) |
| --- | --- | --- | --- | --- |
| 1.25 | — | 105 | 166 | 247 |
| 2.5 | 195 | 47 | 24 | 29 |
| 3.75 | 119 | 24 | 16 | 17 |
| 5 | 54 | 15 | 11 | 13 |
| 6.25 | 28 | 12 | — | 13 |
| 75 | 26 | 10 | — | 9 |
| 8.75 | 18 | 13 | — | 11 |
| 10 | 22 | 12 | — | 9 |
| 12.5 | 22 | — | — | — |

TABLE IX

Emulsion Breaking; Refinery 2
(Blank Turbidity => 2000 NTU; Polymer Conc. as Actives)
Polyvinylamine (PVAm) MW 300–500K

| Dose ppm | Turbidity NTU |
|---|---|
| 25 | 425 |
| 30 | 228 |
| 35 | 93 |
| 40 | 51 |
| 50 | 34 |
| 60 | 100 |

Changes can be made in the composition, operation and arrangement of the method of the present invention described herein without departing from the concept and scope of the invention as defined in the following claims:

We claim:

1. A method of removing emulsified oil from an industrial wastewater stream, the method comprising the steps of adding a water-soluble vinylamine containing polymer having a molecular weight of at least about 25,000 to the oil containing wastewater stream in a concentration of from about 0.1 to about 100 parts per million, based on the total volume of the water being treated, the vinylamine containing polymer including from about 50 to about 100 mole percent vinylamine and from about 0 to about 50 mole percent of at least one monomer selected from the group consisting of amidine, vinylformamide, vinyl acetate, and vinyl pyrrolidinone, wherein the addition of the vinylamine containing polymer to the oil containing wastewater stream causes the emulsified oil to flocculate; and removing the flocculated oil from the wastewater stream.

2. The method of claim 1 where the polymer contains from about 50 to about 99 mole percent of vinylamine.

3. The method of claim 1 where the polymer is a copolymer which contains from about 1 to about 50 mole percent of vinylformamide.

4. The method of claim 1 where the polymer contains from about 80 to about 99 mole percent of vinylamine.

5. The method of claim 1 where the polymer contains from about 10 to about 50 mole percent amidine.

6. The method of claim 1 wherein the polymer is added to the wastewater stream in a concentration of from about 0.1 to about 50 parts per million.

7. The method of claim 1 wherein the polymer is added to the wastewater stream in a concentration of from about 1 to about 20 parts per million.

8. The method of claim 1 wherein the polymer includes from about 50 to about 90 mole percent vinylamine, from about 1 to about 50 mole percent vinylformamide and from about 1 to about 50 mole percent amidine.

* * * * *